United States Patent [19]

Guon et al.

[11] Patent Number: 5,112,534
[45] Date of Patent: May 12, 1992

[54] YTTRIUM AND RARE EARTH STABILIZED FAST REACTOR METAL FUEL

[75] Inventors: Jerold Guon, Woodland Hills; LeRoy F. Grantham, Calabasas; Eugene R. Specht, Simi Valley, all of Calif.

[73] Assignee: The United States of America as represented by The United States Department of Energy, Washington, D.C.

[21] Appl. No.: 489,296

[22] Filed: Mar. 5, 1990

[51] Int. Cl.$^5$ ............................................. G21G 4/00
[52] U.S. Cl. ........................................ 252/640; 420/2; 420/3; 376/419; 376/422; 376/428; 376/901
[58] Field of Search ........................ 376/419, 422, 901; 420/2, 3; 252/636, 637, 640; 423/251, 253, 252

[56] References Cited

U.S. PATENT DOCUMENTS

| | | | |
|---|---|---|---|
| 3,263,004 | 7/1966 | Bean et al. | 376/419 |
| 3,862,908 | 1/1975 | Fitch et al. | 252/301.15 |
| 3,969,185 | 7/1976 | Ross et al. | 176/68 |
| 4,110,159 | 8/1978 | Lee | 176/68 |
| 4,229,258 | 10/1980 | Takeda et al. | 176/76 |
| 4,285,769 | 8/1981 | Specker et al. | 176/30 |
| 4,380,470 | 4/1983 | Conner | 75/122.7 |
| 4,587,087 | 5/1986 | Radford et al. | 376/417 |
| 4,624,828 | 11/1986 | Alexander | 376/421 |
| 4,789,520 | 12/1988 | Morimoto et al. | 376/419 |

OTHER PUBLICATIONS

J. P. Howe, Progess in Nuclear Energy, vol. V, McGraw-Hill, pp. 481-510, especially PS 490.

Primary Examiner—Brooks H. Hunt
Assistant Examiner—Ngoclan T. Mai
Attorney, Agent, or Firm—L. E. Carnahan; Roger S. Gaither; Richard E. Constant

[57] ABSTRACT

To increase the operating temperature of a reactor, the melting point and mechanical properties of the fuel must be increased. For an actinide-rich fuel, yttrium, lanthanum and/or rare earth elements can be added, as stabilizers, to uranium and plutonium and/or a mixture of other actinides to raise the melting point of the fuel and improve its mechanical properties. Since only about 1% of the actinide fuel may be yttrium, lanthanum, or a rare earth element, the neutron penalty is low, the reactor core size can be reduced, the fuel can be burned efficiently, reprocessing requirements are reduced, and the nuclear waste disposal volumes reduced. A further advantage occurs when yttrium, lanthanum, and/or other rare earth elements are exposed to radiation in a reactor, they produce only short half life radioisotopes, which reduce nuclear waste disposal problems through much shorter assured-isolation requirements.

9 Claims, No Drawings

YTTRIUM AND RARE EARTH STABILIZED FAST REACTOR METAL FUEL

STATEMENT OF GOVERNMENT INTEREST

The Government has rights in this invention pursuant to Contract (or Grant) No. DE-AC03-885F17468 awarded by The Department of Energy.

BACKGROUND OF THE INVENTION

Fast reactor designs use fuel rich in actinides. Metal-fueled reactors are limited in operating temperature because of the low melting points of the intermetallic compounds of the actinides. In order to raise the melting point of the actinide-rich reactor fuel and improve the fuel's mechanical properties, approximately 10% zirconium is added in some current designs.

One actinide-rich metal reactor fuel used in fast breeder reactors currently contains approximately 70% uranium, 20% plutonium and 10% zirconium, by weight.

Using zirconium in reactor fuels has several drawbacks. One of these drawbacks is related to the irradiation of zirconium, which produces Zr-93. This isotope has a half life of $1.5 \times 10^6$ years. This long half life presents a problem for waste disposal, in that assured isolation of the waste from the environment is required for millions of years.

Another drawback is that zirconium dilutes the fuel, which necessitates the use of a larger reactor core to produce the same amount of power.

Another drawback to using zirconium is the neutron penalty. The zirconium will absorb neutrons, which wastes fuel. Therefore, more fuel must be used for the same amount of power production.

A further drawback to using zirconium is that the relatively large volume of zirconium waste must be disposed of in an expensive geologic repository. The zirconium also weakens the fuel rod, lowering its operating temperature.

SUMMARY OF INVENTION

This invention substitutes yttrium, lanthanum, and/or rare earth elements for zirconium in actinide-rich fuel, particularly when mixtures of plutonium, minor actinides (neptunium, americium and curium), and uranium are used as fuel material.

In one embodiment of the invention, a fuel rod containing a mixture of 1% yttrium, 20% plutonium and 79% uranium by weight is employed in a fast breeder reactor. In an actinide-burner reactor, minor actinides are substituted for part or all of the plutonium and uranium.

By substituting yttrium, lanthanum, and/or rare earth elements for zirconium, the waste disposal problem of Zr-93 is eliminated. Since yttrium, lanthanum, and/or rare earth elements irradiated in a reactor have short half lives, waste disposal becomes easier because of the need for shorter assured isolation.

Since only 1% yttrium, lanthanum, and/or rare earths are added, the fuel is not diluted as much, which reduces the reactor core size needed for the same power levels. Further, the neutron penalty is reduced by employing fewer yttrium, lanthanum, and/or rare earth atoms, which allows for a more efficient fuel burn.

The melting point of the fuel rods, and the operating temperature of the reactor, are approximately 300° C. higher for the yttrium, lanthanum, or rare earth fuel rods, as compared to unalloyed fuel rods. The melting point is higher because yttrium, lanthanum, and the rare earths are immiscible with uranium and plutonium. Thus, uranium and plutonium combine in a major phase, while yttrium, lanthanum, and rare earths combine with neptunium in a minor phase. This minor phase pins the fuel structure, improving its mechanical properties. The absence of the uranium-plutonium-neptunium intermetallic compound raises the fuel's melting point.

DETAILED DESCRIPTION OF THE PREFERRED EMBODIMENT

A reactor works more efficiently at higher temperatures. Therefore, it is important to use a fuel that can operate in the reactor at higher temperatures.

Metallic fuel for a fast breeder reactor can be composed of approximately 70% uranium, 20% plutonium and 10% zirconium by weight. The addition of zirconium raises the fuel's melting point and operating temperature by about 300° C. to take advantage of the high operating temperature of a liquid-metal cooled fast reactor.

The operating temperature is the highest temperature the fuel can withstand before it begins losing its mechanical shape. If the fuel rods lose their shape, they can damage the reactor. If the fuel becomes a liquid, it can react with the fuel's cladding and damage the reactor.

The present invention increases the operating temperature of the fuel in a metal-fueled fast reactor to approximately the same temperature range as the zirconium-laced fuel, without as large a dilution of the fuel.

For a uranium-plutonium actinide fuel, it is possible to raise the operating temperature by substituting yttrium, lanthanum, or a rare earth element for zirconium. A mixture of yttrium, lanthanum, and rare earth elements may also be used in place of the zirconium.

The fast breeder reactor fuel should be composed of approximately 79% uranium, 20% plutonium and 1% yttrium, lanthanum, or a rare earth element by weight. For the actinide-burner fast reactor, one or more minor actinides can be substituted for from 0% to 100% of the plutonium or uranium, by weight.

The rare earth elements are cerium, praseodymium, neodymium, promethium, samarium, europium, gadolinium, terbium, dysprosium, holmium, erbium, thulium, ytterbium and lutetium. Since yttrium, lanthanum, cerium, praseodymium, neodymium, promethium, samarium, europium and gadolinium are major fission products, these elements can be used for the disclosed purpose, eliminating the need for an external supply, reducing separation requirements during reprocessing, and further reducing the waste disposal volume.

By using only 1% of a non-actinide, the fuel is not diluted very much. The reactor core can be 20% smaller than for the above uranium-plutonium-zirconium mixture.

Since only 1% of the mixture is yttrium, lanthanum, or a rare earth element, the neutron penalty is reduced substantially. The result is a more efficient use of the fuel, which produces a better fuel burn. This will save plutonium and uranium, and reduce the amount of nuclear waste.

Further, since zirconium is not being irradiated, Zr-93, with its long half life, is not being produced. This eliminates a waste disposal problem, as the half lives of the irradiated yttrium, lanthanum, and rare earth elements are less than 100 years, compared to $1.5 \times 10^6$ years for zirconium.

Using the electrorefining process for metal fuel reprocessing removes yttrium and a portion of the lanthanum and rare earths with some difficulty. Leaving some yttrium, lanthanum, or the rare earth elements in the actinides simplifies the processing and reduces the reprocessing problem.

In the uranium-plutonium-yttrium, lanthanum, or rare earth element fuel, yttrium, lanthanum, and rare earth elements are immiscible in uranium and plutonium. In the major phase, uranium and plutonium combine; and in the minor phase, yttrium, lanthanum, and/or rare earth elements combine with neptunium. The formation of the low-melting uranium-plutonium-neptunium intermetallic compound is, therefore, inhibited.

The presence of the minor yttrium, lanthanum, rare earth-neptunium phase pins the material in the fuel rod, increasing the mechanical properties of the fuel. The pinning occurs in the slip planes of the fuel, locking the slip planes in place.

Alternately, only a portion of the zirconium could be replaced with yttrium, lanthanum, and/or rare earths. The fuel could consist of approximately 70% uranium, 20% plutonium, and a 10% mixture of zirconium and yttrium, lanthanum, and/or rare earths, respectively, by weight.

A reactor could be designed primarily as a transuranic actinideburner. The fuel would consist of 0-90% transuranic actinide (neptunium, plutonium, americium, curium, and higher actinides), and from 10-99%+zirconium, yttrium, lanthanum, and/or rare earth stabilizers, by weight.

For a breeder reactor, the fuel can consist of between 60% and 95% uranium, between 5% and 35% plutonium, and between 0.1% and 10% yttrium, lanthanum, or a rare earth element, or a mixture thereof, by weight.

In another embodiment, the fuel can consist of from 60% to 90% uranium, 0% to 25% of at least one transuranic actinide (elements 93 to 107), and 1% to 15% of at least one element from the group consisting of zirconium, yttrium, lanthanum, or a rare earth element, by weight.

In a further embodiment, the fuel can consist of from 0% to 75% of a transuranic actinide, or mixture of transuranic actinides, and from 25% to 99% of zirconium, yttrium, lanthanum, or a rare earth element, or a mixture of these elements, by weight.

I claim:

1. An improved metal alloy reactor fuel consisting essentially of uranium, plutonium, and at least one element from the group consisting of yttrium, lanthanum, cerium, praseodymium, neodymium, promethium, samarium, europium, gadolinium, terbium, dysprosium, holmium, erbium, thulium, ytterbium and lutetium.

2. The improved metal alloy reactor fuel, as in claim 1, wherein the fuel consisting essentially of 79% uranium, 20% plutonium, and 1% of at least one element from the group consisting of yttrium, lanthanum, cerium, praseodymium, neodymium, promethium, samarium, europium, gadolinium, terbium, dysprosium, holmium, erbium, thulium, ytterbium and lutetium, by weight.

3. The improved metal alloy reactor fuel, as in claim 1, wherein the fuel consisting essentially of between 60% and 95% uranium, between 5% and 35% plutonium, and between 0.1% and 10% of at least one element from the group consisting of yttrium, lanthanum, cerium, praseodymium, neodymium, promethium, samarium, europium, gadolinium, terbium, dysprosium, holmium, erbium, thulium, ytterbium and lutetium, by weight.

4. An improved metal alloy reactor fuel consisting essentially of uranium, plutonium and at least one element selected from the group consisting of yttrium, lanthanum, cerium, praseodymium, neodymium, promethium, samarium, europium, gadolinium, terbium, dysprosium, holmium, erbium, thulium, ytterbium and lutetium, where at lease one minor actinide from the group consisting of neptunium, americium and curium is substituted for from 0% to 100% of the actinides uranium and plutonium, by weight.

5. The improved metal alloy reactor fuel as in claim 4 wherein the fuel consisting essentially of 79% uranium, 20% plutonium, and 1% of at least one element from the group consisting of yttrium, lanthanum, cerium, praseodymium, neodymium, promethium, samarium, europium, gadolinium, terbium, dysprosium, holmium, erbium, thulium, and lutetium, by weight.

6. The improved metal alloy reactor fuel, as in claim 4, wherein the fuel consisting essentially of between 60% and 95% uranium, between 5% and 35% plutonium, and between 0.1% and 10% of at least one element from the group consisting of yttrium, lanthanum, cerium, praseodymium, neodymium, promethium, samarium, europium, gadolinium, terbium, dysprosium, holmium, erbium, thulium, ytterbium and lutetium, by weight.

7. The improved metal alloy reactor fuel, as in claim 1, wherein the fuel consisting essentially of from 60% to 90% uranium, 0% to 25% of at least one element from the group consisting of neptunium, plutonium, americium, curium, berkelium, californium, einsteinium, fermium, mendelvium, nobelium, lawrencium, unnilquadium, unnilpentium, unnilhexium, and unnilseptium, and between 1% and 15% of at least one element from the group consisting of zirconium, yttrium, lanthanum, cerium, praseodymium, neodymium, promethium, samarium, europium, gadolinium, terbium, dysprosium, holmium, erbium, thulium, ytterbium and lutetium, by weight.

8. An improved metal alloy reactor fuel where the fuel consisting essentially of from 1% to 75% of at least one element from the group, consisting of neptunium, plutonium, americium, curium, berkelium, and californium, and from 25% to 99% of at least one element from the group consisting of zirconium, yttrium, lanthanum, cerium, praseodymium, neodymium, promethium, samarium, europium, gadolinium, terbium, dysprosium, holmium, erbium, thulium, ytterbium and lutetium, by weight.

9. An improved metal alloy reactor fuel where the fuel consisting essentially of from 1% to 90% of at least one element from the group consisting of neptunium, plutonium, americium, curium, berkelium, and californium, and from 10% to 99% of at least one element from the group consisting of zirconium, yttrium, lanthanum, cerium, praseodymium, neodymium, promethium, samarium, europium, gadolinium, terbium, dysprosium, holmium, erbium, thulium, ytterbium and lutetium, by weight.

* * * * *